United States Patent
Omayu et al.

(10) Patent No.: US 9,047,665 B2
(45) Date of Patent: Jun. 2, 2015

(54) IMAGE PROCESSING APPARATUS

(71) Applicant: PANASONIC INTELLECTUAL PROPERTY MANAGEMENT CO., LTD., Osaka (JP)

(72) Inventors: Hiroaki Omayu, Osaka (JP); Taro Imagawa, Osaka (JP); Toshiyuki Nakashima, Hyogo (JP); Takeshi Hamasaki, Osaka (JP); Hiroyuki Miyahara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/198,758

(22) Filed: Mar. 6, 2014

(65) Prior Publication Data
US 2015/0055862 A1    Feb. 26, 2015

(30) Foreign Application Priority Data
Aug. 21, 2013  (JP) ................................. 2013-171031

(51) Int. Cl.
G06K 9/00    (2006.01)
G06T 5/00    (2006.01)

(52) U.S. Cl.
CPC ....................................... *G06T 5/002* (2013.01)

(58) Field of Classification Search
None
See application file for complete search history.

(56) References Cited

U.S. PATENT DOCUMENTS

| 5,671,264 | A | 9/1997 | Florent et al. |
|---|---|---|---|
| 6,621,937 | B1 | 9/2003 | Adams, Jr. et al. |
| 7,769,089 | B1* | 8/2010 | Chou .......................... 375/240.29 |
| 8,149,336 | B2* | 4/2012 | Mohanty et al. ............... 348/607 |
| 8,199,172 | B2* | 6/2012 | Kuo ............................... 345/690 |
| 8,411,176 | B2* | 4/2013 | Katagiri et al. ................ 348/278 |
| 2006/0055985 | A1 | 3/2006 | Ikeda |
| 2008/0027994 | A1 | 1/2008 | Guan |
| 2009/0102951 | A1 | 4/2009 | Ikeda |
| 2011/0221937 | A1* | 9/2011 | Park et al. ...................... 348/242 |

FOREIGN PATENT DOCUMENTS

| JP | 09-138849 | 5/1997 |
|---|---|---|
| JP | 2001-155148 | 6/2001 |
| JP | 2006-109416 | 4/2006 |
| JP | 2008-061217 | 3/2008 |
| WO | 2012-032707 | 3/2012 |

* cited by examiner

*Primary Examiner* — Phuoc Tran
(74) *Attorney, Agent, or Firm* — Wenderoth, Lind & Ponack, L.L.P.

(57) ABSTRACT

An image processing apparatus comprises: a separation unit configured to separate image data into a luminance signal and a color difference signal; a decision unit configured to decide a reference pixel, which is referenced for a pixel of interest included in the image data; a luminance noise reduction unit configured to reduce luminance noise in the luminance signal of the image data; a weight calculation unit configured to calculate a weight of the reference pixel based on similarity of luminance included in the luminance signal having been subjected to noise reduction by the luminance noise reduction unit between a first area containing the pixel of interest and a second area containing the reference pixel; and a color noise reduction unit configured to reduce color noise in the color difference signal for the pixel of interest by using the weight of the reference pixel.

4 Claims, 4 Drawing Sheets

IMAGE PROCESSING APPARATUS

BACKGROUND

1. Technical Field

The present disclosure relates to an image processing apparatus which reduces color noise included in an image of image data captured by an imaging device.

2. Related Art

JP 09-138849 A discloses a filtering method of setting an axis from a pixel of interest randomly in space and performing a smoothing process on the pixels on the axis. The filtering method reduces noise frequency deviation toward low frequency components after image processing.

The present disclosure provides an image processing apparatus which suppresses color absence, color blur, and the like, which may occur in reduction of color noise included in an image.

SUMMARY

An image processing apparatus according to the present disclosure includes: a separation unit configured to separate image data into a luminance signal and color a difference signal; a decision unit configured to decide a reference pixel, which is referenced for a pixel of interest included in the image data; a luminance noise reduction unit configured to reduce luminance noise in the luminance signal of the image data; a weight calculation unit configured to calculate a weight of the reference pixel based on similarity of luminance included in the luminance signal having been subjected to noise reduction in the luminance noise reduction unit between a first area containing the pixel of interest and a second area containing the reference pixel; and a color noise reduction unit configured to reduce color noise in the color difference signal of the pixel of interest by using the weight of the reference pixel.

The image processing apparatus according to the present disclosure can suppress color absence, color blur, and the like, which may occur in reduction of color noise included in an image.

DETAILED DESCRIPTION OF PREFERRED EMBODIMENT

An embodiment will be described in detail below with reference to the drawings as required. However, unnecessarily detailed description may be omitted. For example, detailed description of already known matters and repetition of substantially the same configuration may be omitted. Such omissions are for avoiding unnecessary redundancy in the following description to facilitate understanding by those skilled in the art.

The present inventor(s) provide the accompanying drawings and the following description for those skilled in the art to fully understand the present disclosure and does not intend to limit the subject matter defined in the claims by them.

First Embodiment first embodiment be described below with reference to FIGS. 1 to 3.

1. Configuration of an Image Processing Apparatus (FIG. 1)

Figure 1:
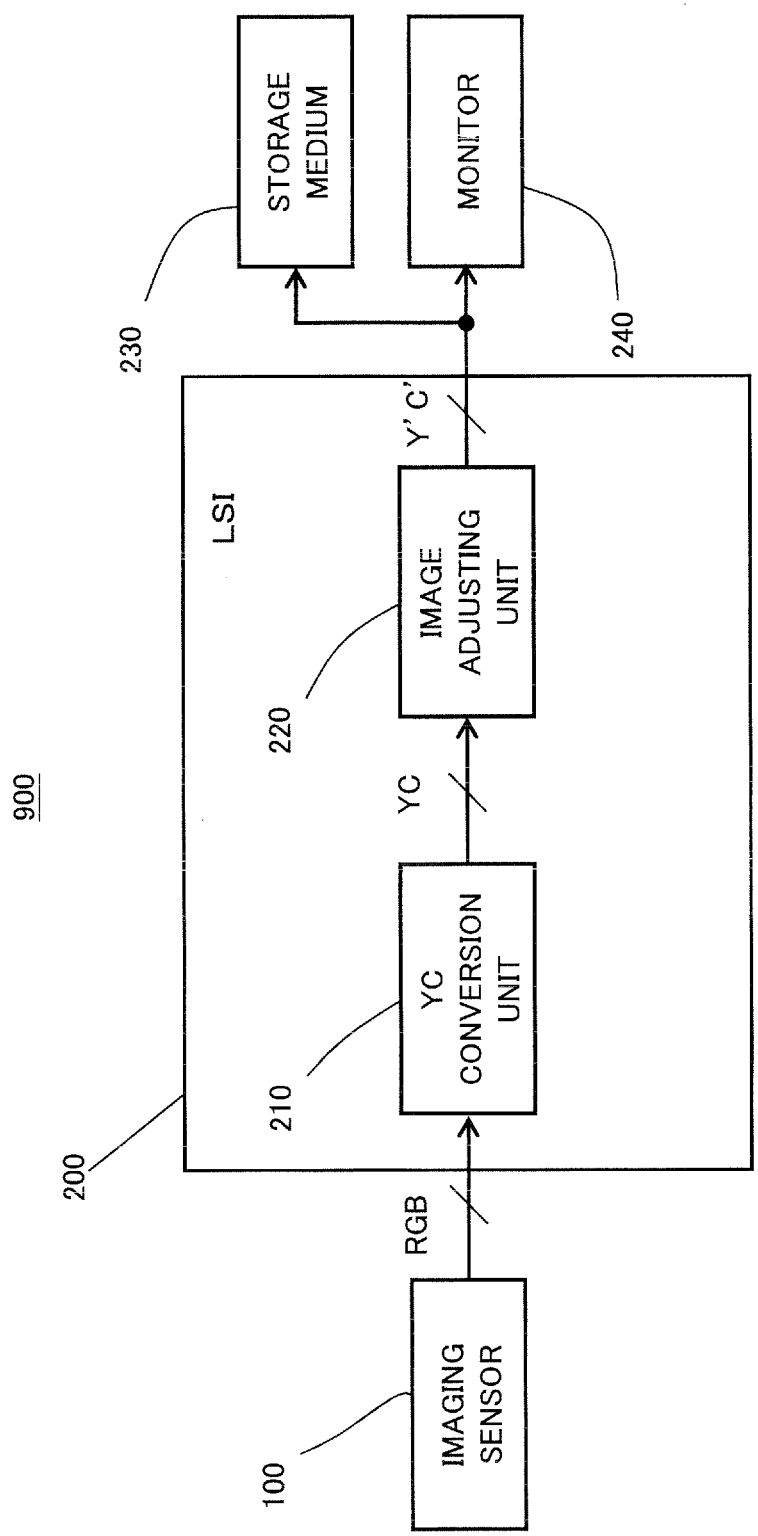
FIG. 1 is a block diagram illustrating a configuration of an image processing apparatus 900 according to a first embodiment.

FIG. 1 is a block diagram illustrating a configuration of an image processing apparatus. An image processing apparatus 900 is applied to an imaging apparatus which has an imaging device such as a digital still camera or a video camera.

The image processing apparatus 900 includes an imaging sensor 100, LSI 200, a storage medium 230, and a monitor 240.

The imaging sensor 100 may be configured to include a CCD or a MOS sensor, for example. The imaging sensor 100 captures a subject image formed by an optical system and outputs image data. The image data obtained from the imaging sensor 100 is, for example, RGB signals with a Bayer array pattern.

The storage medium 230 is composed of, for example, a semiconductor memory (flash memory, SSD (Solid State Drive), memory card) or a hard disk. The monitor 240 is composed of, for example, a liquid crystal display or an organic electro-luminescence display.

The LSI 200 is composed of a semiconductor chip. Functions of the LSI 200 may be realized by hardware (electronic circuit) alone or may be realized by a combination of hardware and software. The LSI 200 inputs image data. The LSI 200 performs predetermined image processing on the input image data by an YC conversion unit 210, an image adjusting unit 220, and the like. The LSI 200 outputs the image data which has been subjected to the predetermined image processing to the storage medium 230 or the monitor 240.

2. Configuration of the Image Adjusting Unit (FIG. 2)

Figure 2:
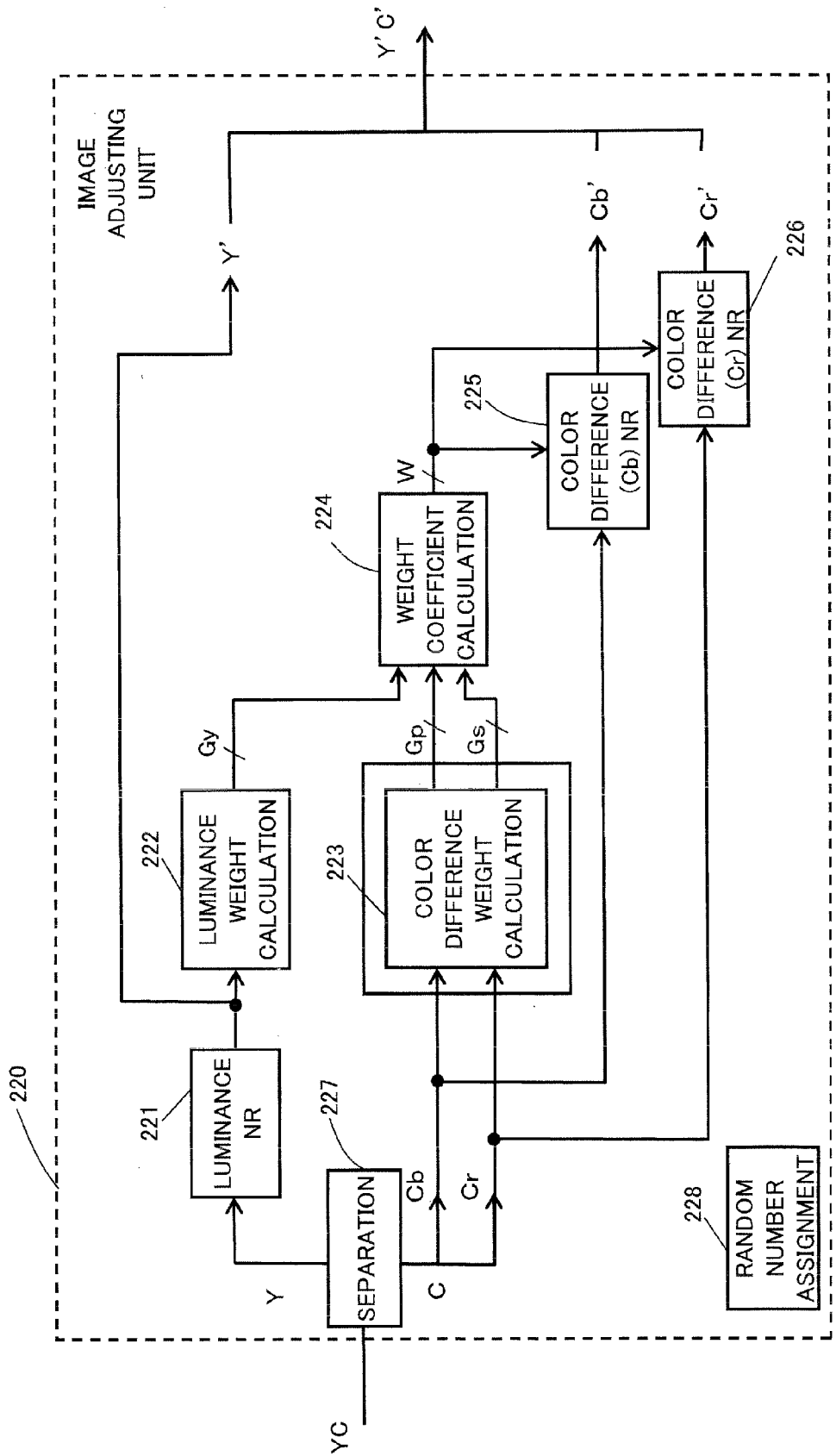
FIG. 2 is a block diagram illustrating a configuration of an image adjusting unit 220 of LSI according to the first embodiment.

FIG. 2 is a diagram illustrating a functional block of the image adjusting unit 220 in the LSI 200.

The image adjusting unit 220 includes a separation unit 227, a luminance noise reduction unit 221, a luminance weight calculation unit 222, a color difference weight calculation unit 223, a weight coefficient calculation unit 224, a Cb noise reduction unit 225, a Cr noise reduction unit 226, and a random number assignment unit 228.

The image adjusting unit 220 inputs image data (YC data) YC which has been subjected to YC conversion by the YC conversion unit 210, performs image adjustment such as color noise reduction on the image data (YC data) YC, and finally outputs color-noise-reduced image data (YC data) Y'C'.

The separation unit 227 separates the image data (YC data) YC input from the YC conversion unit 210 into Y data of luminance and C data of color difference. The C data includes Cr data and Cb data.

The luminance noise reduction unit 221 inputs the Y data, and performs noise reduction (NR) on the input Y data to generate a noise-reduced luminance signal Y'.

The luminance weight calculation unit 222 calculates a weight coefficient Gy from the noise-reduced Y data processed by the luminance noise reduction unit 221 (see Expressions 1 and 2 as described later).

The color difference weight calculation unit 223 calculates weight coefficients Gs and Gp of color saturation (SAT) and color phase (PHA) from the input C data (see Expression 3 as described later).

The weight coefficient calculation unit 224 inputs the weight coefficient Gy of luminance from the luminance weight calculation unit 222 and the weight coefficient Gs of color saturation and the weight coefficient Gp of color phase from the color difference weight calculation unit 223, respectively, and calculates an YC composite weight coefficient W.

Based on the input Cb data and the YC composite weight coefficient W calculated by the weight coefficient calculation unit 224, the Cb noise reduction unit 225 generates color-noise-reduced color difference data Cb'. Based on the input Cr data and the YC composite weight coefficient W calculated by the weight coefficient calculation unit 224, the Cr noise reduction unit 226 generates color-noise-reduced color difference data Cr'.

The luminance data Y' and the color difference data Cr' and Cb' which are generated in the above described manner are output from the image adjusting unit 220 as color-noise-reduced image data Y'C'.

3. Color Noise Reduction Operation of the Image Adjusting Unit

Figure 3:
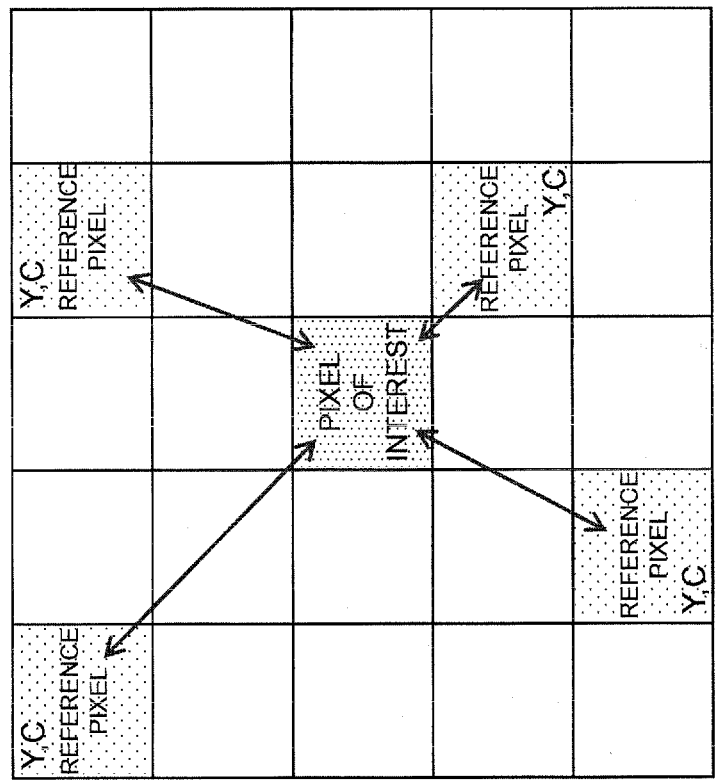
FIG. 3 is a diagram for describing noise reduction performed on a pixel of interest by using luminance information (Y) and color difference information (C) of a reference pixel.

As illustrated in FIG. 3, the image adjusting unit 220 according to the embodiment randomly decides a reference pixel for a pixel of interest from among pixels neighboring the pixel of interest, and performs noise reduction on the pixel of interest by using luminance information (Y) and color difference information (C) (more specifically, color saturation information and color phase information calculated from the color difference information) of the decided reference pixel.

For the purpose of randomly deciding the reference pixel, the random number assignment unit 228 assigns random numbers for respective neighboring pixels around the pixel of interest. A random number for each pixel is expressed as f. For example, a random number for a neighboring pixel at a position (x+u, y+v) is expressed as f (x+u, y+v). In the embodiment, the random number assignment unit 228 assigns binary random numbers which make an expected value e=0 or 1 to the neighboring pixels. Specifically, a random number "1" assigned to a neighboring pixel means that the neighboring pixel is selected as a reference pixel and a random number "0" assigned to a neighboring pixel means that the neighboring pixel is selected as a non-reference pixel.

Figure 4:
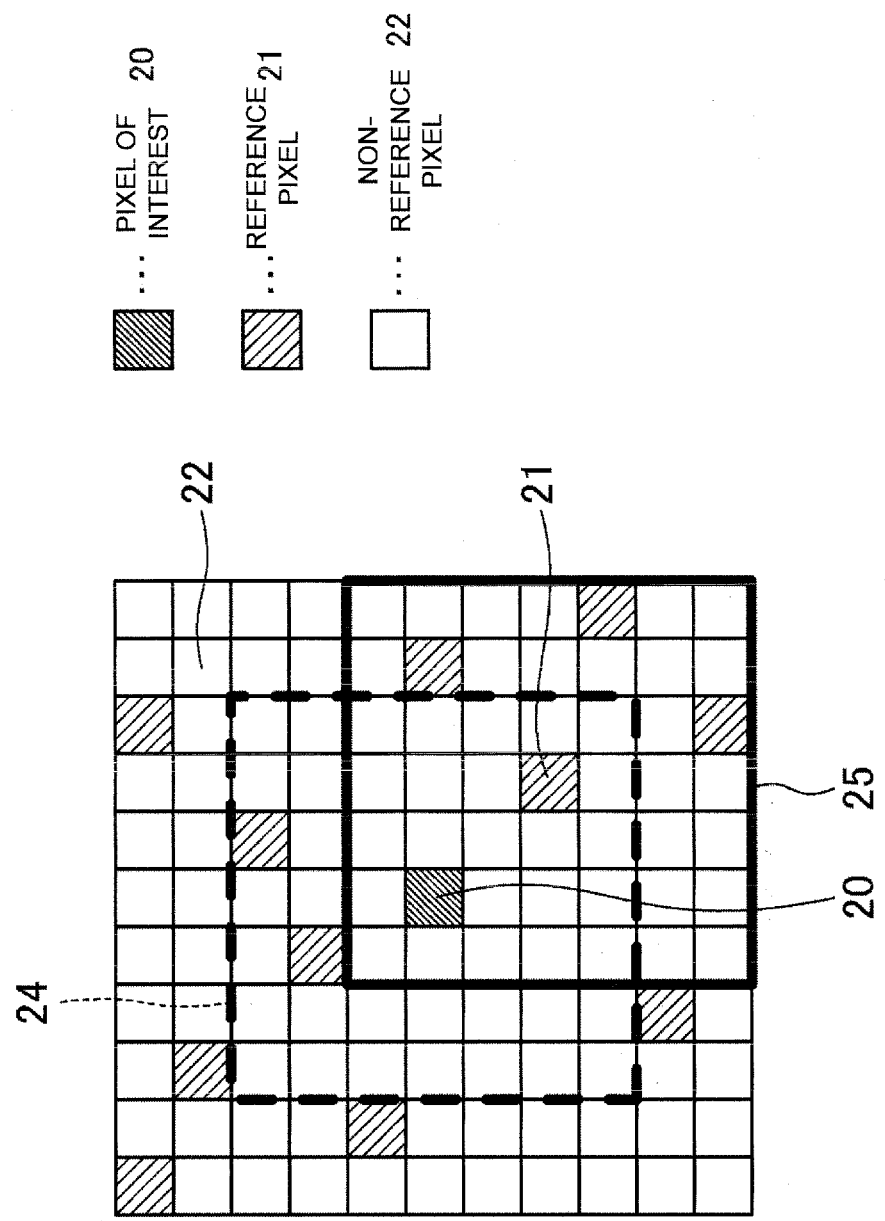
FIG. 4 is a diagram for describing positional relationship between pixels according to the first embodiment.

Here, comparison between the pixel of interest and the reference pixel is performed as comparison between two predetermined areas which are respectively containing the pixel of interest and the reference pixel in the centers. The predetermined areas will be described with reference to FIG. 4. FIG. 4 is a diagram describing positional relationship between pixels of image data processed by the image adjusting unit 220 in the LSI 200 according to the embodiment. In FIG. 4, image data of 11 pixels high by 11 pixels wide is taken as an example. It is assumed that a pixel 20 the center is the pixel of interest. It is also assumed that the pixel of interest 20 is positioned at coordinates (x, y).

In FIG. 4, an area 24 of 9 pixels by 9 pixels outlined by dashed line containing the pixel of interest 20 in the center is referred to as a first area and expressed as J (x, y). Also, an area 25 of 9 pixels by 9 pixels outlined by solid line containing the reference pixel 21 in the center is referred to as a second area and expressed as J (x+u, y+v). The first area 24 and the second area 25 set as described above are used in comparison between the pixel of interest 20 and the reference pixel 21.

Operation for color noise reduction by the image adjusting unit 220 is specifically described below.

The luminance weight calculation unit 222 calculates a weight coefficient Gy of luminance from the luminance-noise-reduced Y data input from the luminance noise reduction unit 221 based on Expression 1 below.

$$Gy(x,u,y,v)=w(Sy(x,u,y,v))$$ [Expression 1]

Here, Gy (x, u, y, v) expresses the weight coefficient (multiplier coefficient) of the pixel at a position (x+u, y+v) with respect to the pixel at the position (x, y). Sy (x, u, y, v) expresses similarity of luminance between the pixel at (x, y) and the pixel at (x+u, y+v). Those pixels are more similar to each other as the value of the similarity of luminance becomes smaller. The function w is a monotonically decreasing function. As the function w, a Gaussian function, an exponential function, a linear function, a piecewise linear function, or the like, for example, may be used. The shape of the function may be changed or switched according to noise intensity in the image. The similarity Sy (x, u, y, v) of luminance between those pixels can be calculated by Expression 2 below.

$$Sy(x,u,y,v)=D(Jy(x,y),Jy(x+u,y+v))$$ [Expression 2]

As illustrated in FIG. 4, Jy (x, y) expresses the first area 24 which is set to contain the pixel of interest 20 at (x, y) in the center, and Jy (x+u, y+v) expresses the second area 25 which is set to contain the reference pixel 21 at (x+u, y+v) in the center. It is assumed that the first area 24 and the second area 25 are in the same shape. The function D expresses a difference between pixel values (luminance values in Expression 2) of the first area 24 and the second area 25. As the function D, a function for adding up absolute values of differences between pixel values (luminance values in Expression 2) of pixels at corresponding locations in the areas 24 and 25 for the all pixels in the areas, for example, may be used. Alternatively, the function D may be a function for summing up the squares of differences between pixel values (luminance values in Expression 2) of pixels at corresponding locations in the areas 24 and 25.

On the other hand, the color difference weight calculation unit 223 inputs data of color difference (C data)- and converts the input C data into data of color saturation (SAT) and color phase (PHA) (see Expression 3). Publicly known techniques are available for conversion of color difference (Cr, Cb) data into data of color saturation (SAT) and color phase (PHA).

$$I(SAT,PHA)=I(Cr,Cb)$$ [Expression 3]

Further, the color difference weight calculation unit 223 calculates weight coefficients Gs and Gp for the converted color saturation data SAT and color phase data PHA, respectively (see Expressions 4 to 7 below). In Expressions 4 to 7, the functions ws and wp, the functions Ds and Dp, and the others have the same capabilities as the functions w, D, etc. mentioned as above, respectively. The functions ws and wp are not necessary to be identical to each other, and the functions Ds and Dp are not necessary to be identical to each other.

$$Gs(x,u,y,v)=ws(Ss(x,u,y,v))$$ [Expression 4]

$$Gp(x,u,y,v)=wp(Sp(x,u,y,v))$$ [Expression 5]

$$Ss(x,u,y,v)=Ds(Js(x,y),Js(x+u,y+v))$$ [Expression 6]

$$Sp(x,u,y,v)=Dp(Jp(x,y),Jp(x+u,y+v))$$ [Expression 7]

In expressions 6 and 7, Ss and Sp express similarities of color saturation and color phase between the pixels (x, y) and (x+u, y+v). In Expressions 4 to 7, the weight coefficients (Gs and Gp) and the similarities (Ss and Sp) of color saturation and color phase can be calculated in the same manners as in calculations of the weight coefficient (Gy) and the similarity (Sy) of luminance described by using Expressions 1 and 2.

The weight coefficient calculation unit 224 calculates a YC composite weight coefficient W based on Expression 8 below by using the weight coefficient Gy of luminance, the weight coefficient Gs of color saturation, and the weight coefficient Gp of color phase calculated by the luminance weight calculation unit 222 and the color difference weight calculation unit 223.

$$W = Gy \times \min(\beta Gs, \gamma Gp) \quad \text{[Expression 8]}$$

The function "min" is for outputting the minimum value of arguments. As shown in Expression 8, the weight of luminance Gy is reflected on the YC composite weight coefficient W. In Expression 8, in the case where the weight of luminance Gy is small (i.e., the similarity of luminance between the pixel of interest and the reference pixel is low), the value of W becomes small, thus, the degree of noise reduction caused by the reference pixel is moderated. As a result, an influence of a pixel having low similarity Sy of luminance becomes low, and therefore, the noise reduction for suppressing color absence and color blur at the edge area of the image data can be realized.

In Expression 8, the coefficients β and γ take different values depending on adjusting methods of a noise reduction process. In the embodiment, the coefficients β and γ are set as β>γ. With that setting of the coefficients, the weight coefficient of color phase (γGp) is made more likely to be selected in Expression 8. As a result, in Expression 8, influence of the similarities on the weight W is like the luminance>the color phase>the color saturation.

The Cr noise reduction unit 226 performs noise reduction on the Cr data. Specifically, the Cr noise reduction unit 226 performs a noise reduction process based on Expression 9 by using the input Cr data and the YC composite weight coefficient W calculated by the weight coefficient calculation unit 224.

The Cb noise reduction unit 225 performs noise reduction on the Cb data. Specifically, the Cb noise reduction unit 225 performs the noise reduction process based on Expression 10 by using the input Cb data and the YC composite weight coefficient W calculated by the weight coefficient calculation unit 224. Here, in Expressions 9 and 10, the function W(x, u, y, v) is for calculating the YC composite weight coefficient W between the pixels at (x, y) and (x+u, y+v).

$$Cr'(x, y) = \frac{\sum_{u,v \in R1} (f(x, u, y, v) W(x, u, y, v) Cr(x+u, y+v))}{\sum_{u,v \in R1} f(x, u, y, v) W(x, u, y, v)} \quad \text{[Expression 9]}$$

$$Cb'(x, y) = \frac{\sum_{u,v \in R1} (f(x, u, y, v) W(x, u, y, v) Cb(x+u, y+v))}{\sum_{u,v \in R1} f(x, u, y, v) W(x, u, y, v)} \quad \text{[Expression 10]}$$

In Expression 9, Cr (x+u, y+v) expresses input image data and Cr' (x, y) expresses output image data. In Expression 10, Cb (x+u, y+v) expresses input image data and Cb' (x, y) expresses output image data. R1 expresses a neighboring area of the pixel of interest (at x, y) (for example, an area of a predetermined size containing the pixel of interest in the center, e.g., the first area) in the image or the whole area of the image. The random numbers f (x, u, y, v) are set from among random numbers from 0 to a certain value (for example, 1). The random number f may be a binary or multiple-valued number, and as the random number, a numerical value of which expected value e is constant or close to constant is used. The random number f is set as it is sequentially generated or as it is read from among previously generated random numbers.

4. Effects and the Like

As described above, the image adjusting unit 220 of the image processing apparatus 900 according to the embodiment includes: the separation unit 227 configured to separate image data into a luminance signal (Y) and a color difference signal (C); the random number assignment unit 228 configured to decide a reference pixel which is referenced for a pixel of interest included in the image data; the luminance noise reduction unit 221 configured to reduce luminance noise in the luminance signal of the image data; the weight coefficient calculation unit 224 configured to calculate a weight (W) of the reference pixel based on similarity of luminance (Gy) included in the luminance signal having been subjected to noise reduction in the luminance noise reduction unit between a first area 24 containing the pixel of interest and a second area 25 containing the reference pixel; and the Cb noise reduction unit 225 and the Cr noise reduction unit 226 configured to reduce color noise in the Color difference signal of the pixel of interest by using the weight (W) of the reference pixel.

As described above, the image adjusting unit 220 according to the embodiment performs color noise reduction by using the weight coefficient W which has been calculated in consideration of the luminance (Y). As a result, the image adjusting unit 220 realizes noise reduction which prevents color absence and suppresses color blur as compared with conventional color noise reduction.

In addition, by setting the weight coefficients to satisfy the relationship β>γ, wrong addition can be prevented even for a position where the luminance level is constant and the color phase is different, and therefore, a change in the color phase in an inappropriate direction can be suppressed in performing the color noise reduction.

Moreover, by performing noise reduction before calculating the weight coefficient Gy of luminance, flat part and edge part of the image data can be distinguished from each other to improve performance of the noise reduction. Here, in case where a noise reduction is not performed before the calculation, noise on the image data causes the similarity between areas which are originally flat to be decreased. As a result, degree of the reference of such flat areas becomes low, and therefore, it may cause deterioration of a performance in color noise reduction. In order to prevent such a situation, in the present embodiment, noise reduction is performed before calculating the weight coefficient Gy of luminance.

That is, in the embodiment, since the image adjusting unit 220 calculates the weight coefficient W to be used in the color noise reduction by taking account of (attaching more importance to) the luminance, it can prevent the reference pixel from being added at the position where the luminance difference is big and can reduce color blur and color absence.

Further, in the embodiment, the weight coefficient calculation unit 224 calculates the weight (W) of the reference pixel further based on the similarity of color phase (Gp) included in the color difference signal between the first area 24 and the second area 25 in addition to the similarity of luminance. As described above, since the image adjusting unit 220 also takes into account of the color phase, it suppresses such a change in the color phase as the color phase different from the original which may occurs in wrong addition of the reference pixel at a position where the luminance level does not vary so much.

As described above, since the LSI 200 takes account of the weight of luminance more than that of the color phase in calculating the weight coefficient, it can realize a highly accurate color noise reduction process. That feature is effective especially at the edge of the image data.

Other Embodiments

As described above, the embodiment has been described as an example of the technology disclosed in the present application. However, the technology in the present disclosure is not limited to the above described embodiment and may also be applied to embodiment which has been subjected to modifications, substitutions, additions, and omissions as required.

Then, other embodiments will be exemplified below.

In the present embodiment, the image adjusting unit 220 is adapted to randomly select a reference pixel by using a random number for each pixel in the luminance weight calculation unit 222 and the color difference weight calculation unit 223. However, other embodiments are not limited to that. For example, in another embodiment, all pixels in a predetermined range (the range of M pixels by N pixels, where M and N are arbitrary numbers) may be selected as reference pixels. In yet another embodiment, pixels remaining after removal of predetermined pixels from the pixels in a predetermined range (the range of M pixels by N pixels, where M and N are arbitrary numbers) may be selected as reference pixels.

The embodiments have been described above as examples of the technology in the present disclosure. For the purpose of describing the embodiments, the accompanying drawings and the detailed description have been provided.

Therefore, in order to exemplify the technology, the constituent elements illustrated or described in the accompanying drawings and the detailed description may include not only the constituent element necessary to solve the problem but also the constituent element unnecessary to solve the problem. Accordingly, it should not be instantly understood that the unnecessary constituent element is necessary only because the unnecessary constituent element is illustrated or described in the accompanying drawings and the detailed description.

Also, since the above described embodiment is for exemplifying the technology in the present disclosure, various changes, substitutions, additions, omissions and the like may be performed on the embodiments without departing from the scope of the claims and the equivalent of the scope of the claims.

INDUSTRIAL APPLICABILITY

The present disclosure can be applied to an image processing apparatus which processes image data including luminance information and color difference information, such as a digital still camera.

The invention claimed is:

1. An image processing apparatus comprising:
    a separation unit configured to separate image data into a luminance signal and a color difference signal;
    a decision unit configured to decide a reference pixel, which is referenced for a pixel of interest included in the image data;
    a luminance noise reduction unit configured to reduce luminance noise in the luminance signal of the image data;
    weight calculation unit configured to calculate a weight of the reference pixel based on similarity of luminance included in the luminance signal having been subjected to noise reduction in the luminance noise reduction unit between a first area containing the pixel of interest and a second area containing the reference pixel; and
    a color noise reduction unit configured to reduce color noise in the color difference signal for the pixel of interest by using the weight of the reference pixel.

2. The image processing apparatus according to claim 1, wherein the weight calculation unit calculates the weight of the reference pixel further based on similarity of color phases included in the color difference signal between the first area and the second area in addition to the similarity of luminance.

3. The image processing apparatus according to claim 1, wherein the weight calculation unit calculates the weight of the reference pixel further based on similarity of color phases and color saturation included in the color difference signal between the first area and the second area in addition to the similarity of luminance.

4. The image processing apparatus according to claim 3, wherein the weight calculation unit calculates the weight by multiplying the similarity of color phases and the similarity of color saturation by respective predetermined coefficients, and
    the predetermined coefficients for the color phases and the color saturation are set to make the similarity of color phases more influential in the weight than the similarity of color saturation.

* * * * *